Oct. 10, 1967   G. B. LONG   3,346,472
METHOD OF REACTING CHEMICAL COMPONENTS USING SONIC
OR SUPERSONIC WAVES
Filed Sept. 5, 1963   3 Sheets-Sheet 3

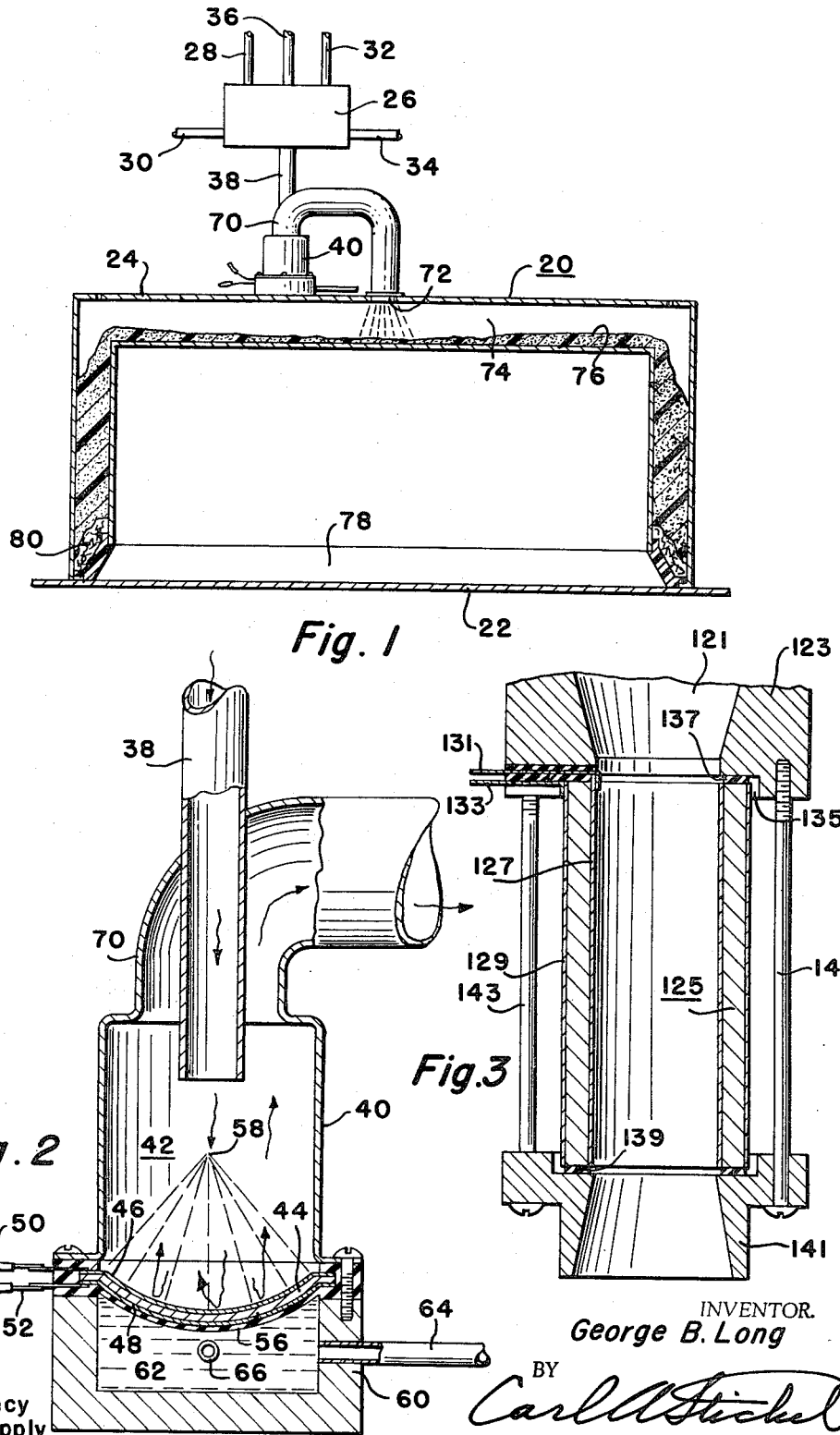

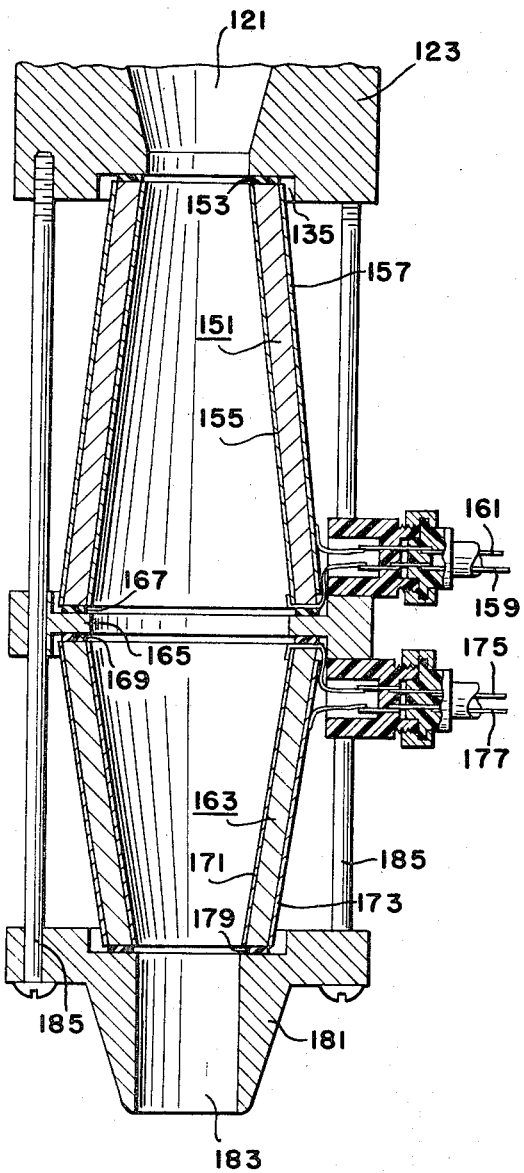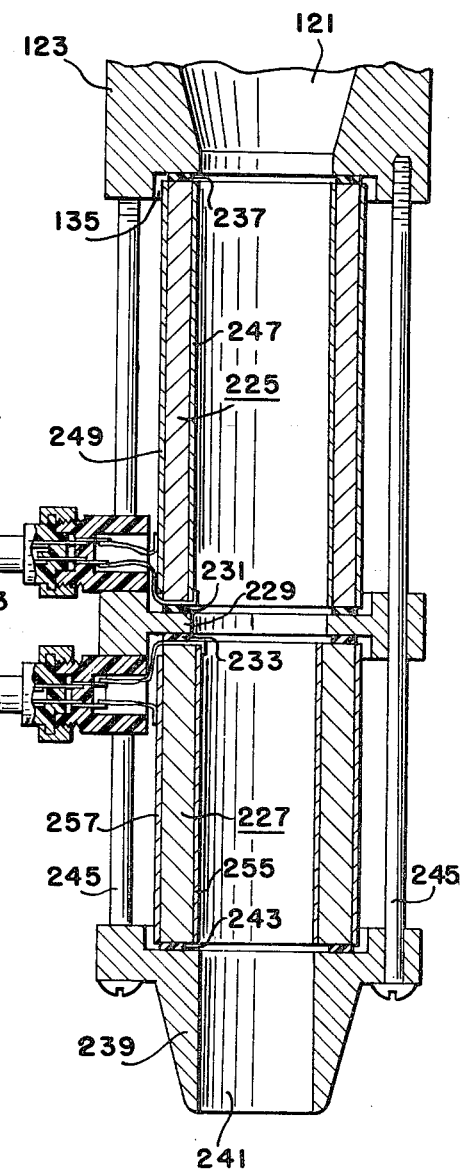
Fig. 4
Fig. 5

INVENTOR.
George B. Long
BY Carl A. Stickel
His Attorney

United States Patent Office 3,346,472
Patented Oct. 10, 1967

3,346,472
METHOD OF REACTING CHEMICAL COMPONENTS USING SONIC OR SUPERSONIC WAVES
George B. Long, Dayton, Ohio, assignor to General Motors Corporation, Detroit, Mich., a corporation of Delaware
Filed Sept. 5, 1963, Ser. No. 306,747
1 Claim. (Cl. 204—157.1)

This invention relates to a method of manufacture and more particularly to subjecting materials capable of reacting and/or polymerizing to wave energy as they are being delivered.

The control of the chemical reaction and/or polymerization is important in obtaining a uniform product having desired characteristics and properties. This is especially true regarding foams and particularly polyurethanes and polyurethane foams. In these reactions it is necessary first to react the isocyanate with an activator mixture to form a monomer which is then polymerized. To provide a satisfactory foam, the gas must be introduced at the most desirable stage of polymerization in which the material is sufficiently strong to hold the gas in a multitude of tiny cells. If the gas is introduced too early before the cell walls acquire sufficient strength there is a tendency for the gas to burst the cells and escape. If the gas is introduced too late there is a tendency to form large cells which are irregular in size. Such forms have a higher density and lower insulating value than is desired.

It is an object of this invention to provide a method of and apparatus for treating and controlling the reaction and/or polymerization of the chemicals with wave energy as they are delivered to present them in the most desirable condition.

It is another object of this invention to provide an improved method of any apparatus for treating and controlling the reaction and/or polymerization of chemicals with wave energy in the sonic and/or supersonic frequency.

It is another object of this invention to provide an improved method of and apparatus for treating and controlling the reaction and/or polymerization of chemicals by passing a gas through a resonator and mixing the gas with the reacting chemicals in the field of the high intensity wave energy of the resonator so that the reaction and the polymerization are brought to the proper state for the mixing with the gas.

It is another object of this invention to provide an improved method of and apparatus for treating and controlling the reaction and/or polymerization of chemicals by passing the chemicals into contact with a vibrating wall or walls vibrating at sonic and/or supersonic frequencies.

It is another object of this invention to provide an improved method of and apparatus for treating and controlling the reaction and/or polymerization of chemicals by passing the chemicals into contact successively with a series of separate vibrating walls one of which vibrates at a sonic frequency and another of which vibrates at supersonic frequencies.

It is another object of this invention to provide an improved method of and apparatus for treating and controlling the reaction and/or polymerization of chemicals by passing the chemicals into the wall spaces of a hollow walled structure in which some or all of the walls vibrate at sonic and/or supersonic frequency.

These and other objects are attained in the forms shown in the drawings in which the foam-forming materials are first mixed in a mixer and then passed into contact with one or more resonating walls which may resonate at the same or different sonic or supersonic frequencies. The application of the sonic or supersonic wave energy to the mixture furnishes energy to speed the reaction and the polymerization thereof as well as induces the foaming of the mixture to produce a low pressure froth prior to polymerization. This froth is then conducted to the space to be filled with the foamed material. The sonic or supersonic energy may be generated by the application of high frequency energy to the opposite surfaces of a barium titanate member which may be in the form of a wall of a chamber or one or more sections of tubing. In other forms of the invention, the sonic or supersonic wave energy is applied to the walls of the cavity which is to be filled by the foam-forming material.

Further objects and advantages of the present invention will be apparent from the following description, reference being had to the accompanying drawings wherein a preferred embodiment of the present invention is clearly shown.

In the drawings:

FIGURE 1 is a vertical sectional view of a refrigerator cabinet placed face down together with foam mixing apparatus and sonic or supersonic generating apparatus through which the foam mixture is delivered before it is discharged into the insulation space of the cabinet;

FIGURE 2 is a vertical sectional view through the sonic or supersonic generator shown in FIGURE 1;

FIGURE 3 is a modified vertical sectional view showing another form of sonic or supersonic generator connected to the outlet of the mixer;

FIGURE 4 is a vertical sectional view similar to that shown in FIGURE 3 but illustrating two sonic or supersonic generators operating at different frequencies for treating the foam mixture;

FIGURE 5 is a vertical sectional view similar to FIGURES 3 and 4 but showing two conical types of sonic generator connected one after another to an outlet of the mixer;

Figure 6:
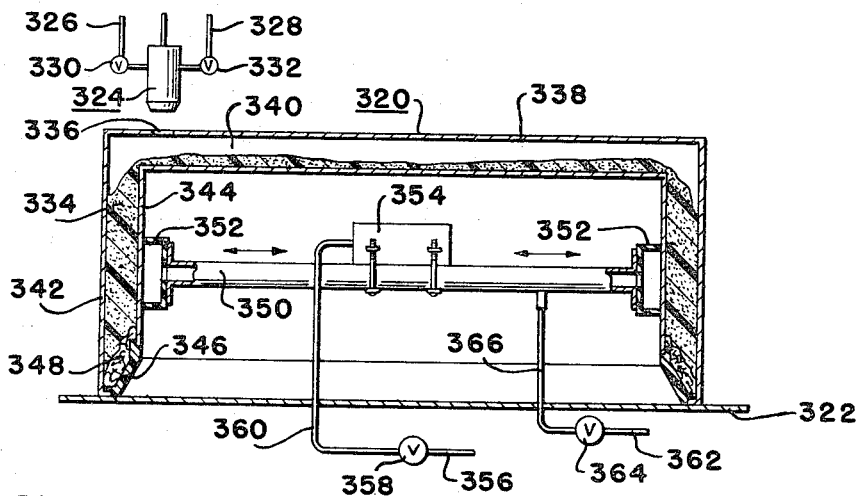
FIGURE 6 is a transverse vertical sectional view through a refrigerator cabinet showing a sonic generator connected to vibrate the inner vertically positioned walls of the refrigerator cabinet.

Referring now to the drawings and more particularly to FIGURE 1 there is shown a refrigerator cabinet 20 placed face down upon the platform 22. Above the rear outer wall 24 of the cabinet 20 there is located a foam mixing apparatus 26 which may be of the type illustrated in Patent 3,092,469 issued June 4, 1963. Preferably this mixing apparatus 26 is used to mix polyurethane foam-forming ingredients in which the resin component is supplied to the mixer 26 through the supply conduit 28 and returned to the resin recirculating system through the return conduit 30. The activator component is supplied through the supply conduit 32 and when not delivered is recirculated to the activator recirculating system through the return conduit 34. An agitator within the mixer 26 is operated by the drive shaft 36 which may be powered by a suitable electric or air motor. When the cabinet 20 is in position to receive the foam-forming ingredients the mixer 26 is operated to deliver the resin and catalyst components in proper proportions to the supply tube 38.

The delivery tube 38 discharges into a reverse flow resonator chamber enclosed by the cylindrical walls 40.

This discharge impinges upon the bottom wall of this chamber 42 which is formed by a sonic or ultrasonic frusto-spherical transducer 44. The wall portion 44 is a hypersonic piezoelectric ceramic transducer preferably made from a polarized barium titanate compound provided with silver or copper electrodes 46 and 48 upper and lower faces respectively which are separately connected by the conductors 50 and 52 to the high frequency alternating current power supply 54. The electrode 48 may be covered by an electrical insulating material 56 which may be rubber or a resilient plastic. The thickness of the wall 44 and the frequency of the power supply 54 are made so as to generate waves of the desired frequency. The frusto-spherical surface of the wall 44 is shaped to concentrate the waves at the point 58 within the chamber 42. This causes the effect of the waves to be concentrated upon the foam-forming material discharged from the tube 38. A frequency between 250 and 1,000,000 cycles per second may be used if desired. For example, a frequency of 440,000 cycles per second may be provided in this way. To prevent the loss of polarization and to prevent the loss of the piezoelectric effect it is necessary that the temperature of the transducer wall 44 be kept below 120° C. For this purpose the transducer wall 44 is provided with a water jacket 60 on its bottom side contacting the surface material 56. This arrangement provides a water chamber 62 through which cold water is circulated in from the pipe 64 and out the pipe 66 to maintain the temperature at 100° C. or below. If desired a metal or suitable plastic diaphram may be substituted for the transducer 44 and mechanically vibrated. By subjecting the foam-forming materials to this concentrated sonic or ultrasonic wave energy in the resonator chamber 42 the mixing and formation of the froth foam is enhanced. Also, the chemical reaction and polymerization as well as the gasification and formation of gas cells therein are accelerated and made more uniform.

In this particular form the foam-forming materials are directed directly onto the vibrating wall 44 so that they can pass through the sonic or ultrasonic waves at least twice. This provides a reverse flow arrangement whereby the treated foam-forming materials pass upwardly through the delivery tube 70 surrounding the inlet tube 38. The delivery tube 70 then makes 180° bend and discharges through the aperture 72 in the rear wall 24 of the refrigerator cabinet 20 into the insulation space 74. The insulating material 76 is shown in the insulating space between the inner and outer walls. At the throat of the door opening is closed by a suitable plastic breaker strip 78 which may cover the strips 80 of Fiberglas insulation which may be provided for receiving refrigerant conduits and electrical conductors beneath the breaker strip 78. The delivery tube 70 also serves as a wave guide through which the sonic and ultrasonic waves may pass through and be discharged within the insulation space 74 to further assist in the treatment of the foam-forming materials.

As one specific example of the foam-forming material, the resin component which may also be called the prepolymer or isocyanate component is made from 79 parts by weight of a polyisocyanate mixture to 21 parts by weight of a polyether A as defined hereinafter. The polyisocyanate mixture comprises 80 parts of 2,4 toluene diisocyanate and 20 parts 2,6 toluene diisocyanate. For the activator component, 87 parts of the same polyether A are mixed with 3 parts of the activator mixture by weight. This activator mixture is made up of two parts of tetramethylbutanediamine and one part of organo-silicone surfactant and 38 parts of trichloromonoflouromethane all by the weight. In the mixer 26 the resin component and the activator components are mixed in proportions by weight of 100 parts resin component to 128 parts activator component.

The polyether A as mentioned above is expressed in mols unless otherwise noted as follows:

| | |
|---|---|
| Sucrose ____mols__ | 1 |
| Propylene oxide ____do____ | 11 |
| Ethylene oxide ____do____ | 4 |
| OH number | 435–470 |
| Water maximum by weight ____percent__ | .15 |
| Viscosity (cps.) at 25° C. | 22,000–32,000 |
| pH | 3.5–5 |

As a second specific example, the resin or prepolymer component is made from 75 parts by weight of the same polyisocyanate mixture and 25 parts by weight of a polyester A as defined hereinafter and 20 parts by weight of trichloromonoflouromethane. The activator component is made up of 60 parts by weight of the same polyester A to 11.4 parts by weight of an activator mixture which is made up of 9.4 parts by weight of anhydrous ethylene glycol, 1 part by weight of dimethylethanolamine and 1 part by weight of organo-silicone surfactant. These two components are mixed in the mixer 26 in the proportion by weight of 120 parts of the resin or prepolymer component to 71.4 parts of the activator component. The polyester A as above noted is made up of 2 mols of phthalic anhydride, 10 mols adipic acid and 18 mols of material known as TMP which is 2,2 dihydroximethyl, 1 butinol. Lead as metallic lead by weight is included in the amount of .030%. The OH number is 440, the acid number maximum is 1.5, water maximum by weight is .15% and the viscosity (cps.) at 165° F. is 2900.

In the modified form shown in FIGURE 3 the mixer 26 is provided with a converging outlet passage 121 in the outlet 123. Connected to this member 123 is a tubular piezoelectric transducer 125. Preferably this tubular transducer 125 is formed of a polarized barium titanate mixture provided with electrodes 127 and 129 on its inner and outer surfaces to which are connected the conductors 131 and 133 which connect to the high frequency alternating current power supply such as 54 in FIGURE 2. The member 123 is provided with an annular recess 135 surrounding the passage 121. It contains a sealing gasket 137 against which rests the upper end of the transducer 125. At the lower end of the transducer 125 is a second gasket 139 which is clamped against the bottom of the tubular transducer 125 by a clamping ring 141 which may be tapered to converge slightly. The clamping ring 141 is connected by a plurality of symmetrically located long screws 143 which are symmetrically arranged around the tubular transducer 125 to clamp the clamping ring 141 firmly against the bottom of the transducer.

In the modified form shown in FIGURE 4, the mixer 26 as in FIGURE 3 is similarly provided with a converging outlet passage 121 in the outlet 123. It differs from FIGURE 3 in that an upper frusto-conical tubular piezoelectric transducer 151 has its upper end fitting tightly against the sealing gasket 153 in the recess 135. Preferably this tubular frusto-conical transducer is formed of a polarized barium titanate mixture provided with electrodes 155 and 157 on its inner and outer surfaces to which are connected the conductors 159 and 161 which connect to a high frequency alternating current power supply similar to the power supply 54 in FIGURE 2. This transducer 151 may replace the single transducer 125 as shown in FIGURE 3. However to obtain a second sonic or supersonic effect, a different frequency, there is provided an inverted tubular frusto-conical transducer 163 coaxially arranged with the outlet 121 and the transducer 151. Between the transducer 151 and the transducer 163 is an intermediate clamping ring 165 having on its opposite faces the sealing rings 167 and 169. The transducer 163 is shorter than the transducer 151 so that it will resonate at a different frequency. It is provided with inner and outer electrodes 171 and 173 to which are connected the conductors 175 and 177, which connect to a second different high frequency power supply corresponding to 54 in FIGURE 2. At the lower end of the transducer 163 is a sealing gasket 179 against which is clamped a bottom clamping ring 181 having an outlet 183. The entire assembly is fastened to the outlet 123 by a plurality of long screws 185 which are symetrically located around the transducers and which pass through apertures in the ring 165 as well as apertures in the ring 181, and thread into the outlet 123 as shown.

In the modified form shown in FIGURE 5 there is connected to the outlet 123 a tubular transducer 225 which is similar to but slightly thinner than the tubular transducer 125 in FIGURE 3. It is similarly lodged against a gasket 237 in the recess 135 surrounding the outlet passage 121. It differs from FIGURE 3 in that coaxially located below the transducer 225 is a second thicker but shorter transducer 227. Between the two transducers is a ring 229 having sealing rings 231 and 233 on its upper and lower faces making sealing engagements with the transducers 225 and 227. Below the lower transducer 227 is a clamping ring 239 having a coaxially outlet passage 241. A sealing gasket 243 is clamped between the clamping ring 239 and the transducer 227. The clamping screws 245 extend through the clamping ring 241 and the ring 229 and thread into the outlet 123. The transducer 225 has inner and outer electrodes 247 and 249 to which are connected the conductors 251 and 253 which connect to a high frequency alternating current power supply similar to 54 in FIGURE 2. The transducer 227 is provided with inner and outer electrodes 255 and 257 to which are connected the conductos 259 and 261 which connect with a high frequency alternating current power supply also similar to 54 in FIGURE 2. Preferably the transducer 225 is operated by its power supply at sonic frequencies while the transducer 227 is operated by its power supply at supersonic frequencies.

In the process of casting foam insulating materials in the walls of refrigerator cabinets as well as other spaced walled structures and other spaces, there exists a problem of moving the incompletely reacted and/or incompletely cured foam into the various parts of the spaces which may receive the foam. After the foam-forming materials are introduced, the exothermic reaction causes foaming and expansion of the materials within the space, driving the partially reacted foam-forming materials to the extremities. There may be either a vertical rise or a lateral movement within the narrow spaces. It takes pressure to move the foam-forming materials. Free movement is desirable to control the uniformity of composition and density and cell structure and also insure a complete fill.

Figure 7:
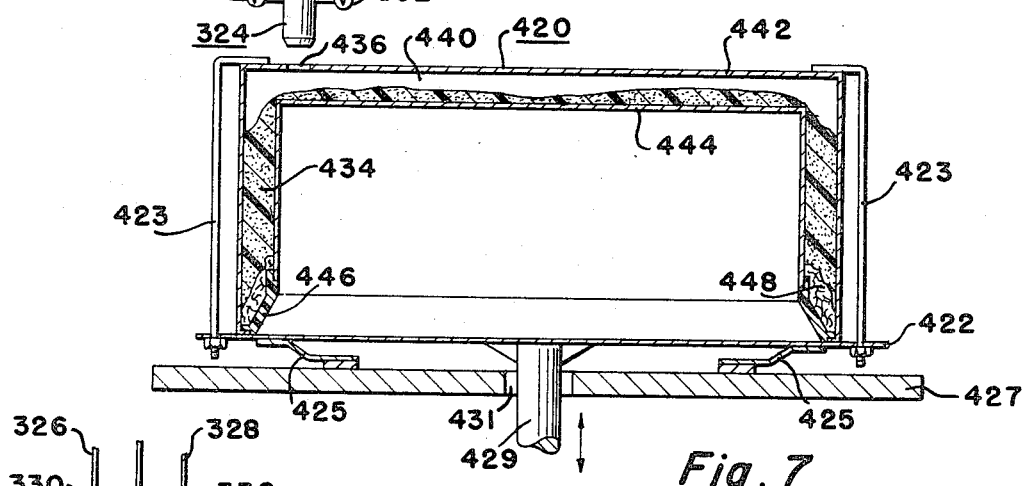
FIGURE 7 is a transverse vertical sectional view showing a refrigerator cabinet in the process of being filled with a foam mixture that is held upon a vibrating table which is vibrated by a sonic or supersonic generator.
Figure 8:
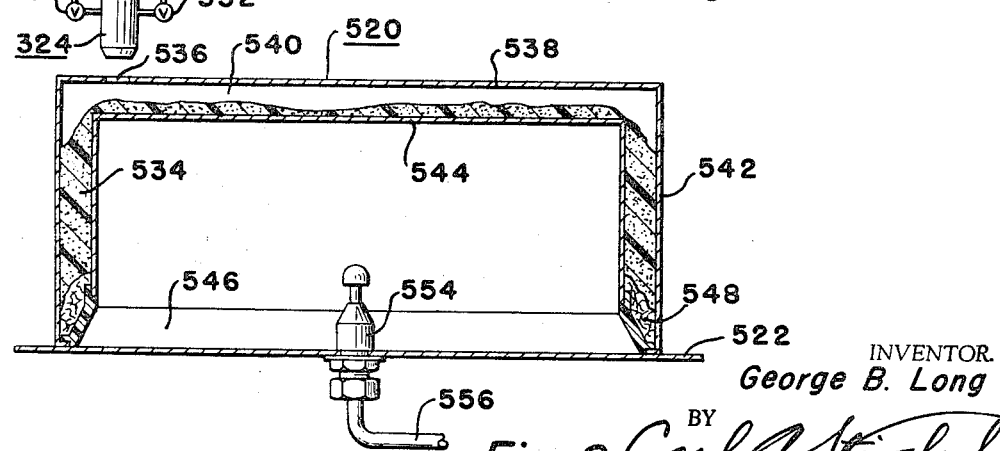
FIGURE 8 is a transverse vertical sectional view through a refrigerator cabinet located face down having a whistle or siren type of sonic generator located in the interior of the cabinet for the purpose of treating the foam-forming material as it is poured into the insulation space to produce low pressure froth foam.

According to the form of the invention illustrated in FIGURES 6 to 8, the more free rise and movement of the foam-forming materials is facilitated by applying sonic or supersonic vibrations to the refrigerator cabinet structure of the hollow wall structure or any other space to be filled with the foam material. This apparently causes a discontinuity at the wall surfaces and prevents or minimizes surface adhesion to the wall surfaces during the expansion thereby facilitating the expansion of the foam-forming materials without the shearing stresses caused by the adhesion to the walls in previous methods. The application of sonic or supersonic vibrations to the foam-forming materials may be continued after the completion of the flowing for the purpose of curing the foam-forming materials. The more free movement of the foam-forming materials as a result of the application of the vibrations thereto during and after the filling of the spaces therefore minimizes the pressure expansion of the foam-forming materials and thereby minimizes the bulging of the walls so that the walls may not need reinforcement of support during the casting of the foam therein.

The form of the invention as illustrated in FIGURES 6 to 8 differs from the form shown in FIGURES 1 to 5 in that in the form shown in FIGURES 1 to 5, the foam-forming materials are subjected to the sonic or supersonic vibrations as they issue from the mixer and before they are deposited in the spaces intended for them. Whereas, in FIGURES 6 to 8, the vibrations are applied after the foam-forming materials are deposited in the spaces intended for them. Referring now more particularly to FIGURE 6, there is illustrated a refrigerator cabinet 320 positioned face down upon the supporting platform 322. The foam mixer 324 is supplied with the two components separately through the pipes 326 and 328 under the control of the valves 330 and 332. The mixer 324 includes a motor driven agitator. The mixer 324 delivers the foam-forming materials 334 through one or more apertures 336 in the rear wall 338 into the insulation space 340 formed between the outer metal walls 342 and the inner metal walls 344. The space at the door opening or throat of the cabinet is closed by a breaker strip 346 which extends between the adjacent edges of the inner and outer walls 342 and 344. The breaker strip 346 on the inside of the space 340 may be provided Fiberglas insulation 348 for receiving electrical conductors and refrigerant conduits to which access may be had by removing the breaker strip 346.

According to this form of my invention, to apply sonic or supersonic vibrations to the foam-forming materials 334 in the space 340, there is provided a long metal tube 350 provided with flanges and suction cups 352 at its opposite ends which extend into an engagement with the adjacent surface of the inner wall 344. Bolted on to this center portion of the tube is a sonic generator 354 which may be of the air or mechanical type which may be fed with air from an air supply pipe 356 under the control of the valve 358 connecting with the air conduit 360. The vacuum pipe 362 provided with a control valve 364 is connected by the conduit 366 to the tube 350 for operating the suction cups 352. This conduit 366 may also have a connection through the tube 350 with the sonic generator 354.

The sonic generator may incorporate an acoustical apparatus such as is illustrated in the Fortman Patent 3,071,303 issued Dec. 25, 1962. The Bodine Patent 2,960,314 issued Nov. 15, 1960, is an example of a suitable air operated mechanical vibrator capable of generating sonic or supersonic vibrations. The forms shown in FIGURES 10 and 11 of this patent are suitable for producing longitudinal vibrations of the tube 350 so as to impart sonic and/or supersonic vibrations to the walls of the cabinet 320. These vibrations are transmitted to the foam-forming material 334 enabling it to move about freely into all parts of the insulation space to assist in its distribution as well as to accelerate and control the chemical reactions and polymerization and the gasification of the material so as to form a substantially uniform light weight cell structure capable of holding the gas in the cells and adhering to the walls of the cabinet. The cabinet is thus provided with great structural rigidity and has a high insulating efficiency.

In FIGURE 7 a cabinet 420, which is similar to cabinet 320, is placed face down upon a vibrating platform 422. It includes inner and outer sheet metal walls 442 and 444 which enclose the insulating space 440 which is to be filled with the foam-forming materials from the same mixer 324 as appears in FIGURE 6. The cabinet 420 similarly includes a breaker strip 446 and the Fiberglas insulation over the removable breaker strip 446. The rear wall includes one or more filler openings 436 through which the foam-forming material is introduced. In this particular form, the cabinet 420 is clamped to the vibrating platform 422 by a plurality of clamps 423 having their upper ends hooked over the rear wall of cabinet 420 and their lower ends passing through apertures in the platform 422 and receiving clamping nuts on the lower side thereof.

The vibrating platform 422 is provided with guiding leaf springs 425 extending between it and the substantially rigid floor 427 which supports the apparatus. The center of the platform 422 has fastened to it a rod 429 extending downwardly through an aperture 431 in the floor 427. A mechanical vibrator, not shown, is connected to the rod 429 so as to cause the platform 422 and the cabinet 420 clamped on to be vibrated by the sonic or supersonic frequencies. Any suitable vibrating mechanism may be used for vibrating the rod 429. For example, the vibrating means shown in either the Fortman or the Bodine patents as mentioned above may be used or some other form of mechanical or electrical vibrator may be used for this purpose. By vibrating the cabinet 420 during the time the foam-forming material 434 is introduced into the space 440, the chemical reaction and the polymerization of the foam-forming materials are accelerated and regulated and the gasification of the foam-forming material is brought about at a more suitable time so that a more uniform cellular insulating material is obtained which permanently holds the gas within the cells thereof.

In FIGURE 8 a cabinet 520, similar to a cabinet 420, is placed face down on the platform 522. The same foam-forming material mixer 324 delivers the foam-forming material 534 through apertures 536 in the rear wall 538 into the insulation space 540 between the outer and inner walls 542 and 544. These walls are joined by the breaker strip 546 having over it the glass fiber insulation 548. During and after their introduction into the space 540 the foam-forming materials 534 are treated with sonic and/or supersonic vibrations. This is accomplished through the use of the acoustical vibrator 554 which is mounted on the vibrating platform 522 within the inner and outer wall 534 of the cabinet 520. An inner supply pipe 556 supplies air under pressure to the vibrator 554 to generate the sonic or supersonic vibrations which radiate outwardly to vibrate both the inner metal walls 544 and the outer metal walls 542 as well as the foam-forming materials 534 in the space 540 in between these walls. The acoustical vibrator 554 may be of the type illustrated in the aforementioned Fortman patent. These vibrations prevent premature adhesion of the foam-forming materials 534 to the inner and outer walls 542 and 544 and assist in the uniform distribution of these materials in addition to accelerating the chemical reactions and the polymerization and the gasification of these materials to produce a more uniform lighter weight product having better insulating and structural properties. The vibrations also assist in the curing of the foam.

While the embodiment of the present invention as herein disclosed, constitutes a preferred form, it is to be understood that other forms might be adopted.

What is claimed is as follows:

The method of reacting chemical components which includes mixing the components capable of reacting and passing the mixture first into contact with a first vibrating wall vibrating at a first frequency within the range of 250 to 1,000,000 cycles per second and then passing the mixture into contact with a second vibrating wall vibrating at a second substantially different frequency within the range of 250 to 1,000,000 cycles per second.

References Cited

UNITED STATES PATENTS

| | | | |
|---|---|---|---|
| 2,138,051 | 11/1938 | Williams | 264—23 |
| 3,072,584 | 1/1963 | Karpovich | 250—2.5 |
| 3,196,975 | 7/1965 | Voelker | 181—33 |
| 3,203,762 | 8/1965 | Carpenter | 204—157.1 |

FOREIGN PATENTS

| | | |
|---|---|---|
| 139,161 | 10/1950 | Australia. |

HOWARD S. WILLIAMS, *Primary Examiner.*

JOHN H. MACK, *Examiner.*